United States Patent [19]

Morin

[11] Patent Number: 4,921,276
[45] Date of Patent: May 1, 1990

[54] SPRAY CONTROLLING FENDER

[76] Inventor: Albert Z. Morin, Apt. 801, 2200 Regent Street, Sudbury, Ontario, P3E 5S2, Canada

[21] Appl. No.: 197,601

[22] Filed: May 23, 1988

[51] Int. Cl.⁵ .............................................. B62D 25/16
[52] U.S. Cl. .................................... 280/848; 280/851
[58] Field of Search ................... 280/154.5 R, 153 R, 280/848, 851

[56] References Cited

U.S. PATENT DOCUMENTS

| | | | |
|---|---|---|---|
| 3,743,343 | 7/1973 | Grote et al. | 280/154.5 R |
| 3,834,732 | 9/1974 | Schons | 280/154.5 R |
| 3,922,003 | 11/1975 | Lea | 280/154.5 R |
| 4,192,522 | 3/1980 | Morgan | 280/154.5 R |
| 4,334,694 | 6/1982 | Iwanicki | 280/154.5 R |
| 4,427,208 | 1/1984 | Jurges | 280/154.5 R |
| 4,436,319 | 3/1984 | Clutter | 280/154.5 R |
| 4,660,846 | 4/1987 | Morin | 280/154.5 R |

FOREIGN PATENT DOCUMENTS

| | | | |
|---|---|---|---|
| 2165508 | 4/1986 | United Kingdom | 280/154.5 R |
| 2191160 | 12/1987 | United Kingdom | 280/154.5 R |

*Primary Examiner*—David M. Mitchell
*Attorney, Agent, or Firm*—Burke-Robertson

[57] ABSTRACT

A fender for a wheel or a set of wheels for one side of an automotive vehicle, for controlling the wet weather spray and splash generated thereby when travelling on a roadway surface. The fender comprises a formed, rigid sheet mounted over and covering the wheels or set of wheels and downwardly curves at its forward and rearward ends. A removably downwardly depending skirt extends along the edges of the sheet. One or more air intake apertures in a forward, curved end of the sheet directs air from outside the fender to inside the fender and over the wheel or set of wheels covered thereby during forward movement of the vehicle. A spray shield in sheet form is adapted to be disposed above the roadway surface vertically depending form the rear of the rigid sheet and is spaced rearwardly from the vehicle wheel or wheels in a plane extending transversely to the vehicle. A plurality of rearwardly opening louvers in the shield extend, when the shield is in position, horizontally between its sides over a major portion of the area of the shield. The louvers permit flow of air and spray through the shield and cause a downward deflection thereof. The shield according to the present invention significantly reduces the hazard created by spray generated by a vehicle's tires by developing an airflow within the fender and as it leaves the fender which collects and downwardly deflects that spray to the surface of the roadway.

5 Claims, 2 Drawing Sheets

SPRAY CONTROLLING FENDER

FIELD OF THE INVENTION

The present invention relates a fender device which controls wet weather spray and splash generated by the wheels of an automotive vehicle. It relates more particularly to a fender which is adapted to be suspended over each of the wheels, or each of the sets of wheels, on each side of an automotive vehicle, and particularly large vehicles such as trucks and trailers to restrict the spray of rain, dust, snow and rocks which may be thrown upwardly and rearwardly or laterally by such wheels.

BACKGROUND OF THE INVENTION

Particularly during conditions of rain or snow, heavy vehicles such as trucks, tractor trailers and buses generate clouds of spray either beside or behind them, as a result of the action of their wheels on the roadway surface, as they travel over such surface. As well, other road surface materials such as mud, pebbles, salt and dust may be propelled upwardly in a spray to either side or behind such vehicle. Such sprays are dispersed into adjacent traffic lanes making it dangerous or impossible for that vehicle to be passed by another, or making it dangerous or hazardous to follow behind such vehicle or for oncoming traffic to go by that vehicle.

Such problems have been previously recognized and many solutions proposed. For example, U.S. Pat. No. 4,192,522 of Morgan issued Mar. 11, 1980 describes a splash and spray control shield for the wheels of large vehicles consisting of a shield which covers the upper parts of a wheel, and has, at its forward end, a funnel-like air scoop which sits over the upper front half of the wheels and which defines an enlarged front opening and a constricted rear opening through which the flow of air from in front of the scoop is forcefully directed rearwardly along the top wall of the shield. A resilient shield extension is fastened to the rear section of the shield to downwardly direct the spray to the road surface. This construction of shield generates additional wind resistance on such a device; the faster the vehicle moves, the greater the wind resistance generated by the vehicle. The use of the scoop device to force air over the wheels, as well as the resilient shield extension at the rear of the shield generates increased pressure and turbulence within the device which can carry spray to the sides of the vehicle.

In my U.S. Pat. No. 4,660,846 issued Apr. 28, 1987, I described and illustrated a louvered spray shield to be placed behind the wheels of large vehicles, the louvers of which shield directed air through the louvers and downwardly towards the roadway surface, thereby significantly reducing the spray generated by the wheels of such a vehicle.

Other patents of general background interest are Wenham, et al U.S. Pat. No. 2,619,363 issued Nov. 25, 1952; Eaves U.S. Pat. No. 2,940,773 issued Jun. 14, 1960; Barry, et al U.S. Pat. No. 3,088,751 issued May 7, 1963; Salisbury U.S. Pat. No. 3,350,114 issued Oct. 31, 1967; Jones U.S. Pat. No. 3,279,818 issued Oct. 18, 1966; Iwanicki U.S. Pat. No. 4,334,694 issued Jun. 15, 1982; Brandon, et al U.S. Pat. No. 4,325,563 issued Apr. 20, 1982; and Grote, et al Canadian Patent No. 955,290 issued Sept. 24, 1974, all of these patents describing and illustrating various constructions of vehicle splash guards which have been previously proposed.

OBJECTS OF THE INVENTION

It is an object of the present invention to provide a device for providing better control the spray of moisture and other materials which is generated by the wheels of large vehicles during movement over a roadway surface. It is a further object of the present invention to provide such a device which can use air flow to achieve this control, without creating significant additional wind resistance and increased turbulence at higher vehicle speeds.

SUMMARY OF THE INVENTION

In accordance with the present invention, in order to achieve these objects, there is provided a fender for a wheel or a set of wheels for one side of an automotive vehicle, for controlling the wet weather spray and splash generated thereby when travelling on a roadway surface. The fender comprises a formed, rigid sheet mounted over and covering the wheels or set of wheels and downwardly curves in strealined fashion over a small portion of the upper surfaces of the wheels at its forward and rearward ends. A preferable removable, downwardly depending skirt extends along each edge of the sheet. One or more air intake apertures in the upper part of the forward, curved end of the sheet are provided to direct an even flow of air from outside the fender to inside the fender and over the wheel or set of wheels covered thereby during forward movement of the vehicle. A spray shield in sheet form is adapted to be disposed above the roadway surface vertically depending from the rear of the rigid sheet and is spaced rearwardly from the vehicle wheel or wheels in a plane extending transversely to the vehicle. A plurality of rearwardly opening, permanently opended louvers in the shield extend, when the shield is in position, horizontally between its sides over a major portion of the area of the shield. The louvers permit flow of air and spray through the shield and cause a downward deflection thereof.

In a preferred embodiment of the present invention the fender is provided, on the inner surface of the rigid sheet, with integral, formed guide ribs. These ribs extend in spaced parallel fashion forwardly to rearwardly on the sheet. These ribs facilitate air flow and restrict air turbulence within the fender.

The fender device according to the present invention may be incorporated in a construction of a new vehicle, or retrofitted to an old one. When in position over the wheels of a truck, trailer or the like, the fender in accordance with the present invention develops a steady, non-forced air flow over the wheels of the vehicle, and out the louvers in the spray shield at the back, where the air and spray is directed downwardly to the roadway surface. In this way, the device effectively reduces the upward turbulence and spray generated at the rear of the vehicle, behind and to the sides of the fender, thereby significantly increasing the highway safety, to the other vehicles, of vehicles carrying such fenders.

BRIEF DESCRIPTION OF THE DRAWINGS

These and other objects and advantages of the invention will become apparent upon reading the following detailed description and upon referring to the drawings in which.

Figure 1:
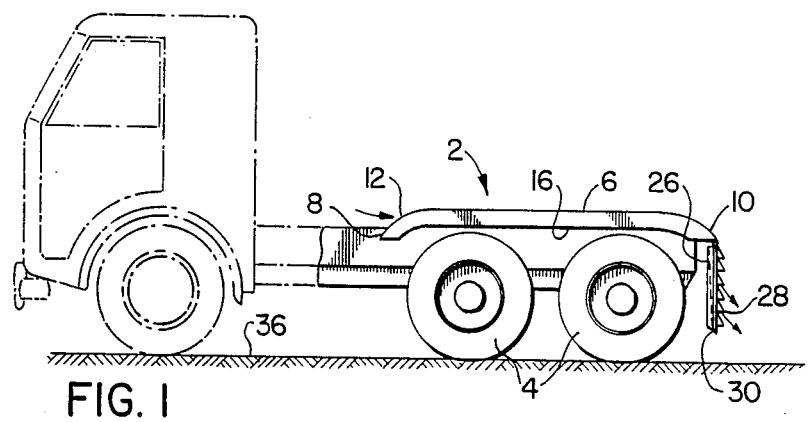
FIG. 1 is a side view of a fender in accordance with the present invention over a set of trailer wheels.

While the invention will be described in conjunction with an example embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

Figure 2:
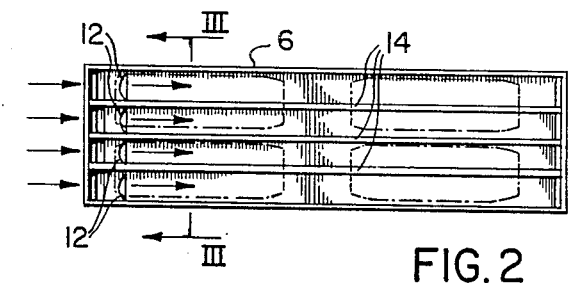
FIG. 2 is a plan view, from below, of the fender of FIG. 1.
Figure 3:
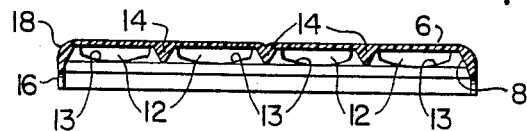
FIG. 3 is a front view cross-section along line I—I of the fender of FIG. 1.

Turning to FIG. 1 there is illustrated a fender 2 in accordance with the present invention mounted in a multi-axial arrangement of a set of wheels 4. Fender 2 comprises a formed, rigid sheet 6 which is mounted over and covers wheels 4. Sheet 6 is curved slightly downwardly at its forward end 8, and rearward end 10 (with a greater radius of curvature) as illustrated. Sheet 6 may be made of any appropriate material such as an appropriate metal, fiberglass, plastic or the like. At the forward end 8 of sheet 6, situated in the curved portion thereof, are a plurality of apertures 12 extending across fender 2. Apertures 12 are formed, as can be seen in FIGS. 2 and 3, with a rounded arcuate base 13 (the corners of a rectangular slot would increase the turbulence of air entering the fender below sheet 6 and provide more opportunity for constriction for example by build-up of slush and ice, for lodging of debris. The size of the slots is important, since if the slots are too large too much air tends to enter fender 2 resulting in increased turbulence and forcing of air and debris outwardly, in a sideways direction, from beneath fender 2. On the other hand, if slots 12 are too small, the desired air flow from front to back within fender 2 is restricted and is not as efficient. Slots 12 are intended to be of an appropriate size so that an even flow of air is created from in front of fender 2, through slots 12 and beneath sheet 6, within fender 2 from front to back, as a truck moves. In other words, it is intended that the air pressure outside and surrounding fender 2 be the same as that within fender 2 during movement of the vehicle on which fender 2 is mounted.

On the lower surface of rigid sheet 6 are formed a plurality of longitudinally extending guide ribs 14, spaced in parallel fashion from side-to-side across sheet 6. These guide ribs 14 are important to assist in reducing turbulence which otherwise might develop beneath sheet 6 during movement of the vehicle, by assisting in the directing of air entering beneath fender 2 through apertures 12, from front to back beneath the fender. As well, as can be seen in FIG. 3, the lower edge 13 of aperture 12 is upwardly angled to deflect air entering that aperture upwardly towards ribs 14. This feature further assists in reducing turbulence and facilitating air flow.

Figure 5:
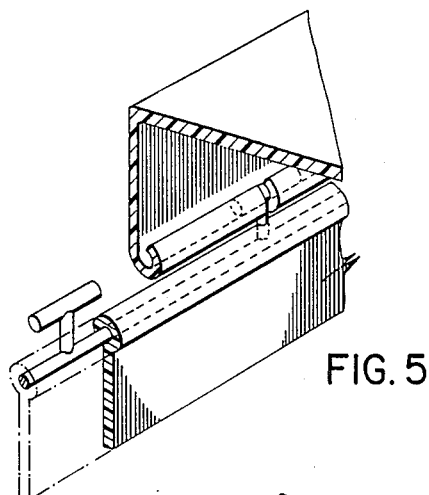
FIG. 5 is a perspective view, in partial section, of the fender of FIG. 1, to the side, illustrating a detail of the suspension of a side skirt from the fender.

As can be seen in FIGS. 3 and 5, a removable skirt 16 made, for example, of a flexible material such as a rubber or a flexible plastic, downwardly depends from the edges 18 of sheet 6 along its length. These edges 18 are inwardly curled, as illustrated in FIG. 3, and provided with slots 20 through which appropriate T-like wire suspension hangers 22 can be fitted to rest on these curled edges 18. As can be seen in FIG. 5 the lower portions 24 of these suspension hangers 22 are embedded in, or otherwise secured to flaps 16. In this manner flaps 16 may be readily removed for servicing or replacement.

Figure 6:
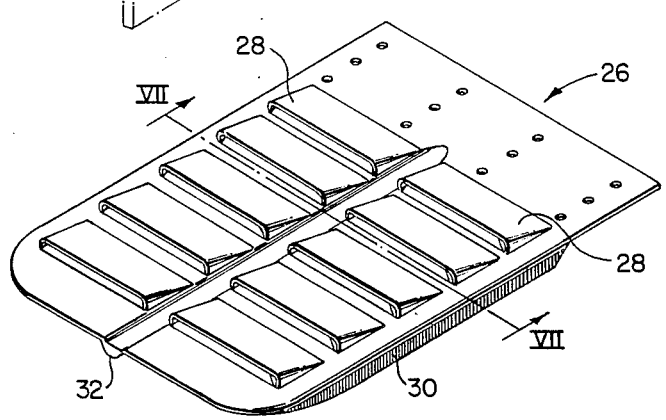
FIG. 6 is a perspective view of the spray shield at the rear of the fender of FIG. 1.
Figure 7:
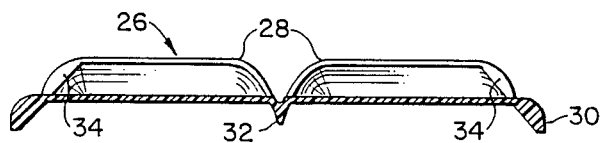
FIG. 7 is a cross-sectional view of the spray shield of FIG. 5 along line VII—VII.

At the rear of sheet 6, downwardly depending from rear portion 10 is suspended a spray shield 26. This sheet is generally in sheet form, as illustrated in FIG. 6, and has a plurality of rearwardly extending, permanently opened louvers 28 mounted horizontally, between the edges of shield 26, over a major portion of the area of the shield. Forwardly extending side flanges 30 extend along opposite sides of the shield 26. Shield 26 is preferably made of a flexible material such as heavy duty rubber. Shield 26, when in position, has a forwardly extending V-shaped center 32 to minimize wind resistance on the forward surface of shield 26. In this construction, twin sets of louvers 28 are provided on either side of center 32 to equalize and balance the flow of air through the shield. As well, it is preferred to provide on the inside, forwardly oriented face of louvers 28, on their sides opposite from center 32, a plurality of reinforcing webs 34. The webs are each side of louvers 28 are preferably spaced from each other so as to permit air flow therebetween, thereby further facilitating and directing the flow of air as it passes through louvers 28.

The twin sets of louvers, while appropriate for larger, dual wheel sets of wheels on either side of the axial of a vehicle, may not be required for single wheels, in which case a shield 26 having a single set of louvers 28 will be adequate.

Figure 4:
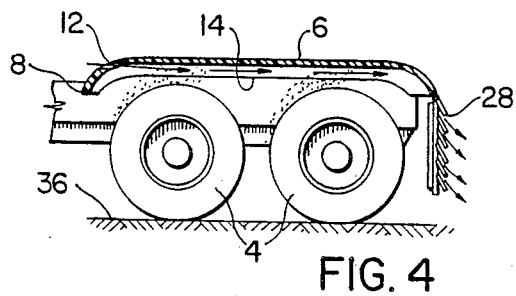
FIG. 4 is a side section view of the fender of FIG. 1 along line IV—IV of FIG. 1.

In operation, as a vehicle mounted with fenders 2 over each set of wheels 4 moves forwardly, air passes through apertures 12 and is directed, by the motion of the truck and guide ribs 14, to the rear below sheet 6. It is then directed downwardly to pass outwardly through louvers 18 in shield 16. As the speed of the vehicle increases, so does the flow of the air in this fashion within fender 2, this flow of air collecting droplets of water, dust particles or other debris, generated by the turning of wheels 4 into its stream (FIG. 4), and reducing air turbulence around these wheels. As well, when the air flow passes through shield 26, louvers 28 directed downwardly to be deposited on roadway surface 36. In this manner, there is a surprising reduction of spray which would otherwise be generated sideways or rearwardly with respect to wheels 4, over conventional fenders and any of the prior art devices. Moreover, as a vehicle mounted with fenders 2 travels faster, the efficiency of operation of fender 2, if anything, increases since the air flow beneath sheet 6 and out of louvers 28 becomes stronger, drawing more moisture and debris. An additional advantage, because of the construction of applicant's device, is that moisture and other debris which is drawn into the flow of air beneath sheet 6, being heavier than the air itself, tends to be expelled through shield 26 through lower louvers 28, thereby assisting in depositing of such moisture and debris more directly on the pavement than in the air, with a resultant reduction in generation of spray behind the vehicle.

Because of the simple construction of fender 2, when compared with prior art devices previously referred to and intended for a similar function, the fender in accordance with the present invention may be made significantly lighter than such prior art devices. Also the fender 2 in accordance with the present invention, because of its construction, provides minimal wind resistance both at forward end 8 and rearward end 10. These features result in significant fuel economy, when compared to such prior art devices, for vehicles equipped with fenders 2 in accordance with the present invention.

While not illustrated, the fender 2 in accordance with the present invention is also designed to accommodate smaller wheels or single axle systems, such fenders being shortened in length or otherwise modified to suite the smaller wheels or single axle systems. They would still operate in a similar fashion to that of FIGS. 1 to 7.

Thus it is apparent that there has been provided in accoradance with the invention a fender for a wheel or a set of wheels that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim is:

1. A fender for a wheel or set of wheels for one side of an automotive vehicle, for controlling the wet weather spray and splash generated thereby when travelling on a roadway surface, the fender comprising:
   (a) a formed, rigid sheet mounted over and covering the wheels or set of wheels and downwardly curved in streamlined fashion over a small portion of the upper surface of the wheels at its forward and rearward ends;
   (b) a downwardly depending skirt extending along each edge of the sheet;
   (c) one or more air intake apertures in the upper part of the forward, curved end of the sheet to direct an even flow of air from outside the fender to inside the fender and over the wheel or set of wheels covered thereby during forward movement of the vehicle; the intake aperture or apertures having lower edged that are of upwardly curved, arcuate shape and being positioned and of such a size than an even flow of air from outside the fender to inside the fender, at about the same pressure inside the fender as around the fender on the outside, is achieved during forward movement of the vehicle; and
   (d) a spray shield in sheet form adapted to be disposed above the roadway surface vertically depending from the rear of the rigid sheet and spaced rearwardly from the vehicle wheel or wheels in a plane extending transversely to the vehicle, a plurality of rearwardly opening, permanently opened louvers in the shield extending, when the shield is in position, horizontally between its sides over a major portion of the area of the shield, the louvers to permit flow of air and spray through the shield and cause a downward deflection thereof.

2. A fender according to claim 1 wherein guide ribs are provided on the inner surface of the rigid sheet, extending in spaced parallel fashion forwardly to rearwardly on the sheet, the guide ribs to facilitate air flow and restrict air turbulence within the fender.

3. A fender according to claim 2 wherein the shield is made of flexible material.

4. A fender according to claim 1 wherein the skirts and sheet edges are provided with means for releasable attachment of the skirts to the edges of the sheet.

5. A fender according to claim 2 wherein the guide ribs are integrally formed on the inner surface of the rigid sheet.

* * * * *